Dec. 24, 1968     A. MEULNART     3,417,503
SPINNER FOR FISHING BY THE BAIT-CASTING METHOD
Filed Feb. 17, 1967
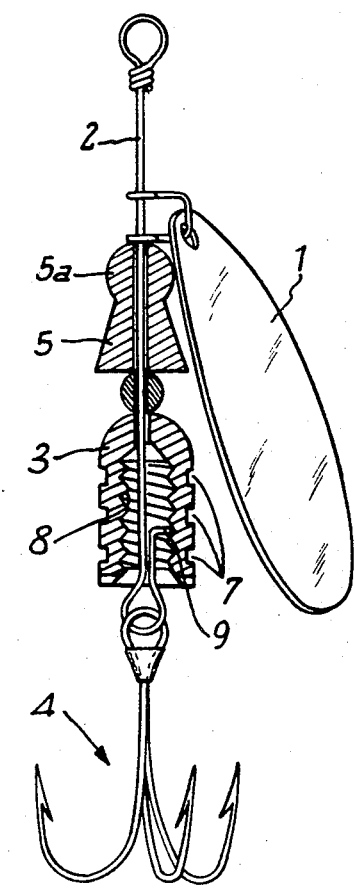
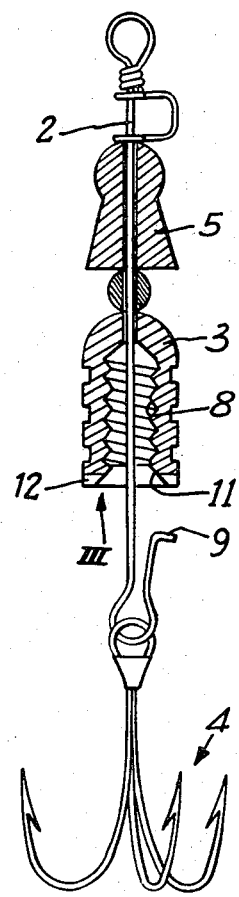
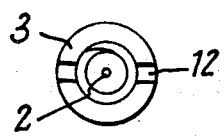
INVENTOR
ANDRE MEULNART

United States Patent Office 3,417,503
Patented Dec. 24, 1968

3,417,503
SPINNER FOR FISHING BY THE
BAIT-CASTING METHOD
Andre Meulnart, 37 Ave. Paul Doumer,
Paris 16eme, France
Filed Feb. 17, 1967, Ser. No. 616,936
Claims priority, application France, Dec. 20, 1966,
88,129
1 Claim. (Cl. 43—42.08)

ABSTRACT OF THE DISCLOSURE

A spinner for use in fishing by the bait-casting method is formed of a shank having a bent end arranged to receive hook means. A sinker is slipped freely on the shank and has a tapped axial cavity arranged to receive a nose on the bent end of the shank within threads formed in the axial cavity. Further, the end face of the sinker directed toward the hook means is shaped to facilitate the entry of the nose into the cavity in the sinker.

Summary of the invention

The invention relates to fishing tackle known as "spinners" used more particularly for fishing by the bait-casting or spinning method and comprising a paddle mounted on a shank carrying the fish hook or hooks and a stabilizing sinker, in such manner that the said paddle begins to spin when the device, attached to the end of a line by means of the said shank, undergoes a relative movement with respect to the surrounding water in which it is immersed.

The object of the invention is to produce a spinner with a construction which is simple and inexpensive, but nevertheless permits attachment and detachment of the hooks with ease, speed and safety.

To this end, in the spinner according to the invention, the sinker is in the form of a cylindrical or prismatic body slipped freely on to the shank and having a tapped axial cavity in the threads of which there is engaged a nose formed on the suitably bent end of that portion of the shank which carries the fish hook or hooks.

Due to this special structure, in order to remove a fish hook, it is sufficient to unscrew, as it were, the end of the shank until the nose thereof leaves the tapped cavity in the sinker, the end of the said shank being then in the form of an open hook from which it is easy to remove the fish hook. Reassembly is equally simple. After slipping a fish hook on to the hook formed at the bent end of the shank, the said bent end is squeezed together between the fingers and the nose thereof is inserted in the entry of the tapped cavity in the sinker. The bent end is turned a few times to drive the nose well into the said cavity. Due to its inherent elasticity, the bent end of the shank, which tends to open, causes its nose to bear very strongly against the flanks of the internal thread of the sinker and opposes opening of the device at the wrong time.

The invention also has for its object forms of embodiment having at least one of the following characteristics:

(a) The entry of the cavity has a widt, frusto-conical flaring portion designed to facilitate the starting off of the nose of the bent end of the shank into the threads of the said cavity.

(b) The end face of the body, into which end face the cavity opens, has a diametral groove of suitable size for receiving the bent end of the shank and preventing it from turning with respect to the body on the engagement of the nose of the shank in the said body.

The invention will be better understood by reading the following description and examining the accompanying drawing, which shows a form of embodiment of a spinner according to the invention.

In the drawings:

FIG. 1 shows the spinner assembly in longitudinal section in the fishing position.

FIG. 2 shows the same spinner in the open position in which a fish hook is removed and placed in position, and FIG. 3 is a bottom view in the direction of the arrow III in FIG. 2.

The spinner shown in its entirety in FIG. 1 comprises the paddle 1, the shank 2, the upper end of which is designed to be attached to a line, the stabilizing sinker 3, a fish hook 4 (which may be a single or multi-branched hook), mounted at the lower end of the shank 2, and a spacing piece for the paddle which is constituted by a part 5 in the form of a truncated cone surmounted by a spherical part 5a.

The stabilizing sinker 3 is constituted by a body of revolution, for example of cylindrical or prismatic forms, preferably having grooves or channels such as 7, which are possibly coloured.

In the example shown, the body 3 is substantially of cylindrical form, its upper end being rounded, while its lower end is plane. It has a deep axial cavity 8 which is tapped and in the threads of which there is engaged a nose 9 (see also FIG. 2) formed on the suitably bent end of that portion of the shank 2 to which the fish hook 4 is attached.

In the inoperative state, the lower end of the shank 2 has the form shown in FIG. 2, that is to say it forms a slightly open hook in which the fish hook or hooks can easily be placed in position. In order to assemble the spinner, the body 3 is gripped with one hand, while with the other the shank 2 is made to move upward into the said body until the nose 9 at the end of the shank, which is kept squeezed together engages in the thread of the cavity 8 in the body 3. The body 3 is then turned a few times with respect to the loop of the shank 2 so as to ensure locking of the assembly.

With the object of facilitating the starting of the nose 9 in the internal thread of the body 3, the entry of the cavity 8 has a frusto-conical flaring portion 11 and, moreover, the plane bottom face of the said body has a diametral groove 12 of a width sufficient to receive the nose 9 of the shank. Due to these two complementary steps, assembly is facilitated, because, on the one hand, it is possible to squeeze the lower part of the shank together more comfortably between the thumb and the index finger of the right hand, while the nose 9 is engaged in the groove 12 of the body 3, which is held between the thumb and the index finger of the left hand.

By pushing the loop of the shank towards the inside of the body, the nose 9 is easily made to slide against the conical portion 11 of the flaring portion right into the screw thread, in which it engages without any difficulty. The assembly then takes the form shown in FIG. 1. The elasticity of the shank compels the end of the nose 9 to bear strongly against the flanks of the thread of the cavity 8, so that the shank can no longer turn with respect to the sinker and there is no risk of losing the fish hook.

It would be possible to produce a sinker such as that hereinbefore described, but not comprising the diametral groove 12, or even not comprising the frusto-conical flaring portion 11 either.

I claim:

1. A spinner for fishing by the bait casting method comprising a shank, a paddle mounted on said shank, hook means carried by said shank, a stabilizing sinker slipped freely on said shank, said sinker having a tapped axial cavity, said shank having a bent end portion carrying said hook means and a nose formed on said end portion arranged to engage the thread of said tapped axial cavity, said sinker having an end face thereof directed toward said hook means and a transverse groove in said end face constructed to receive the nose of the shank to facilitate entry of the nose into the cavity and thereby restrain said shank against rotation by engagement of the nose in the thread of said cavity.

References Cited

UNITED STATES PATENTS

| | | | |
|---|---|---|---|
| 242,866 | 6/1881 | Beach | 43—44.86 |
| 2,142,267 | 1/1939 | Freeman et al. | 43—44.86 X |
| 2,796,695 | 6/1957 | Meulnart | 43—44.86 |

FOREIGN PATENTS

| | | |
|---|---|---|
| 611,651 | 1/1961 | Canada. |
| 1,332,705 | 6/1963 | France. |
| 739,671 | 11/1955 | Great Britain. |

SAMUEL KOREN, *Primary Examiner.*

J. H. CZERWONKY, *Assistant Examiner.*

U.S. Cl. X.R.

43—42.17, 42.36, 42.39, 44.86